Patented Aug. 14, 1945

2,382,418

UNITED STATES PATENT OFFICE 2,382,418

2-SUBSTITUTED FURAN-3,4-DICARBOXYLIC ACIDS AND THEIR CORRESPONDING SATURATED ANALOGUES

Klaus Hofmann, Summit, N. J., assignor to Ciba Pharmaceutical Products, Incorporated, Summit, N. J., a corporation of New Jersey No Drawing. Application September 25, 1942, Serial No. 459,674

9 Claims. (Cl. 260—345)

This invention relates to a process of preparing 2-substituted furan-3,4-dicarboxylic acids and their corresponding saturated analogues of the general structure I or IA. According to the present invention the said furan derivatives are prepared by reacting a 2-substituted furan derivative II with an acetylene-dicarboxylic ester to produce the complex III, which is partially hydrogenated in the presence of a suitable catalyst to form the compound IV. Compound IV on distillation loses one molecule of ethylene, and forms the corresponding 2-substituted furan-dicarboxylic ester V, which by saponification is transformed into a compound of the general structure I. Such compounds I may be transformed by catalytic hydrogenation, if desirable, into compounds of the general structure IA. The following formulae illustrate the procedure:

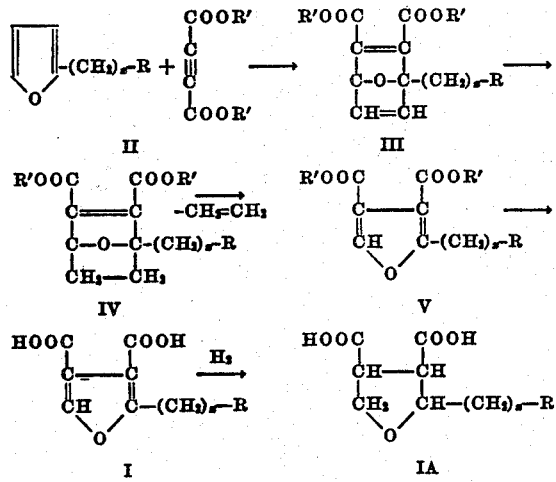

While the 2-methyl-3,4-furan-dicarboxylic acid is known, the prior art contains no 2-substituted-3,4-dicarboxylic acids wherein the 2-substituent is a relatively complicated side chain as compared with the relatively simple CH₃— group, nor was it at all obvious that the compounds with the complex 2-substituents could be successfully prepared.

It has now been found that a great number of 2-substituted furan-3,4-dicarboxylic acids can be prepared according to the above general procedure. Suitable starting materials are the 2-substituted furans of the general formula II wherein R stands for a carboxyl group or a group which can be transformed into a carboxyl group and $x$ stands for the numbers 2, 3, 4 and more.

Among the groups which can be transformed to a carboxyl group the following ones may be mentioned: aliphatic and aromatic esters such as methyl, ethyl, propyl, phenyl, benzyl esters; aliphatic and aromatic amides such as amide, mono- and dimethylamide, diethyl amide, piperidide, anilide, N-methylanilide; nitrile; hydroxyl; halogen; aldehyde and derivatives thereof such as acetal.

Esters of the acetylene-dicarboxylic acid which may be used in the reaction are, for example methyl, ethyl, propyl, isopropyl, phenyl, benzyl esters.

For the partial reduction of the intermediate of the formula III the following catalysts may for example be used: metals of the platinum group such as platinum, palladium or others as such or on carriers, or nickel in the various forms used for such purpose. The catalytic reduction of the furan ring to the corresponding saturated compounds may be carried out by applying well known methods to the specific compounds (see Houben-Weyl: Methoden der org. Chemie, 3rd ed. vol. 2 page 345).

The new compounds are useful for the preparation of substances which are valuable for therapeutic purposes or as intermediates in the production of such substances.

The following examples illustrate methods of carrying out the present invention, but it is to be understood that the examples are given by way of illustration and not of limitation.

Example 1

1.2 g. of furyl-(2)-n-valeric acid ethyl ester were mixed with 980 mg. of acetylene-dicarboxylic acid-diethyl ester and the mixture was heated on the steam bath for 18 hours, after which time the mixture was taken up in 10 cc. of ethyl acetate and was hydrogenated in the presence of palladium black until 1 molecule of hydrogen had been absorbed.

The catalyst was then separated from the solution and the ethyl acetate was evaporated in vacuum, leaving a viscous oil which was distilled in vacuum. The fraction boiling between 165–168° C. at 0.01 mm. pressure was collected and represents the triethyl-ester of furan-3,4-dicarboxy-(2)-n-valeric acid. When the ester is treated with alkali the free tricarboxylic acid is obtained. M. P. 188–189° C.

The tricarboxylic acid was suspended in water and enough 2N KOH was added to make the solution pink to phenolphthalein. Raney nickel was added to the solution and it was hydrogenated at 2400 pounds and 150° C. for 5 hours. The solution was then acidified to Congo red, was evaporated to dryness in vacuo and the organic material was extracted with ethyl acetate. The extracted acids were esterified in the usual manner and the methyl ester was distilled and the tetrahydro-3,4-dicarb - methoxy-furan-(2)-n-valeric acid-methyl ester was obtained.

Example 2

2 g. of furyl-(2)-n-valeric acid were mixed with 2 g. of acetylene-dicarboxylic acid-diethyl ester and the mixture was heated to 90° C. for 6 hours. The reaction product was dissolved in 20 cc. of ethyl acetate and was then hydrogenated in the presence of palladium on calcium carbonate catalyst and was distilled in vacuum. The fraction boiling at 203–204° C. 0.04 mm. pressure corresponds to furan-3,4-dicarboxy-ethyl-(2)-n-valeric acid. Saponification of this ester yields the tricarboxylic acid M. P. 188–189° C., identical with the acid as obtained in Example 1.

Example 3

A solution of 2.35 g. of furyl-(2)-n-valeric acid piperidide and 1.42 g. of acetylene-dicarboxylic acid-dimethyl ester were boiled for 10 hours in 50 cc. of dry benzene. The benzene was then evaporated in vacuum and the viscous residue dissolved in 20 cc. of methanol and hydrogenated in the presence of Raney nickel catalyst until one molecule of hydrogen had been absorbed. The solution was then separated from the catalyst by filtration, concentrated to dryness and the residue was distilled in vacuum. The distillate was dissolved in a mixture of 5 cc. of methanol and 3 cc. of 5/N aqueous KOH, and the solution was refluxed for 2 hours. The methanol was removed in vacuo and the residue was acidified to Congo red. The furan-3,4 - dicarboxy - (2) - n - valeric acid piperidide separated out, which melted after recrystallization at 131° C. This material was hydrolyzed by boiling it 6 hours with 50 cc. of a mixture of 50% glacial acetic acid and 50% concentrated hydrochloric acid. The residue after evaporation of the acetic acid hydrochloric acid mixture melted at 188–189° C. and was identical with the material obtained according to Examples 1 and 2.

4 grams of 3,4-dicarbethoxy-furan-(2)-n-valeric acid piperidide were dissolved in 40 cc. of ethyl alcohol and were hydrogenated in the presence of nickel on kieselguhr catalyst at 150° C. and 2500 pounds pressure. The catalyst was then removed by filtration and the 3,4-dicarbethoxy-tetrahydrofuran-(2)-n-valeric acid piperidide was distilled in vacuum.

Example 4

1.98 g. of furyl-(2)-n-valeraldehyde-dimethyl acetal were heated in a sealed tube with 1.42 g. of acetylene-dicarboxylic acid-dimethyl ester for 10 hours to 90°–100° C. The viscous oil was then dissolved in 20 cc. of ethyl alcohol and was hydrogenated in the presence of platinum black catalyst. The hydrogenation came to an end when the amount of hydrogen, corresponding to one double bond, had been taken up. The solution was then separated from the catalyst and was evaporated in vacuo. The residue was distilled in vacuo to decompose the complex and the distillate was dissolved in a mixture of 20 cc. of methanol and 20 cc. of 5N NaOH and kept at 20° C. for 48 hours. The methanol was then distilled off and the remaining aqueous solution was acidified to Congo red and heated on the steam bath for 2 hours. The 3,4-dicarboxy-furyl-(2)-n-valeraldehyde was extracted with ether and was oxidized with freshly prepared silver oxide in alkali solution. The tricarboxylic acid obtained melted at 188–189° C. and was identical with the substance obtained according to Example 1.

Example 5

1.54 g. of furyl-(2)-n-butyric acid and 1.70 g. of acetylene-dicarboxylic acid-diethyl ester were dissolved in 20 cc. of toluene and the solution was refluxed for 5 hours. The toluene was then removed and the residue was hydrogenated in ethylalcohol solution in the presence of palladium on barium-sulfate catalyst. The catalyst was then removed and the alcohol was evaporated in vacuo. The residue was distilled in vacuo, whereby the addition compound was decomposed and 3,4-dicarbethoxy-furan-(2)-n-butyric acid was obtained. Saponification of the ester yielded 3,4-di-carboxy-furan-(2)-n-butyric acid.

Having described the invention, what is claimed is:

1. The 2-substituted furan - 3,4 - dicarboxylic acids of the formula $$(COOH)_2—A—(CH_2)_xR$$

wherein A is a nucleus of the group consisting of the furan and tetrahydrofuran nuclei, the COOH groups being attached in the 3,4-positions of the said nucleus, and the —(CH$_2$)$_x$R group being attached in the 2-position of the said nucleus, $x$ being a whole positive integer, and R being a member of the class consisting of a carboxyl group and a group convertible to a carboxyl group.

2. The 2-substituted furan - 3,4 - dicarboxylic acids of the formula

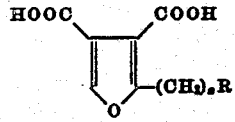

wherein $x$ represents a whole positive integer, and R stands for a member of the class consisting of a carboxyl group and a group convertible to carboxyl.

3. The 2-substituted furan - 3,4 - dicarboxylic acids of the formula

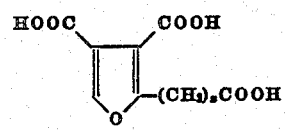

wherein $x$ represents a whole positive integer.

4. The furan-3,4-dicarboxy-(2)-n-valeric acid of the formula

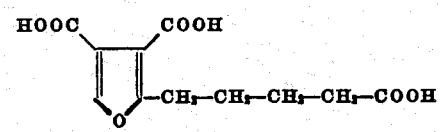

having a melting point of 188°–189° C.

5. The 2-substituted furan - 3,4 - dicarboxylic acids of the general formula

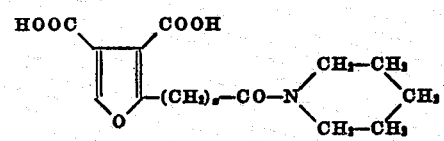

wherein $x$ is a whole positive figure.

6. The furan-3,4-dicarboxy-(2)-n-valeric acid piperidide of the formula

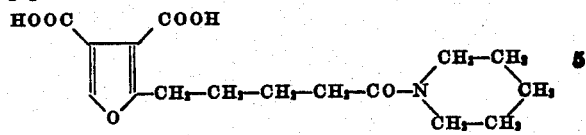

having a melting point of 131° C.

7. The 2-substituted tetrahydro-furan-3,4-dicarboxylic acids of the formula

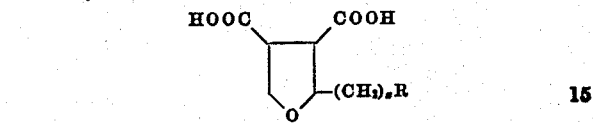

wherein $x$ represents a whole positive integer, and R stands for a member of the class consisting of a carboxyl group and a group convertible to carboxyl.

8. The 2-substituted tetrahydro-furan-3,4-dicarboxylic acids of the formula

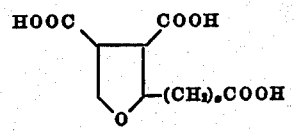

wherein $x$ represents a whole positive integer.

9. The tetrahydro-furan-3,4-dicarboxy-(2)-n-valeric acid of the formula

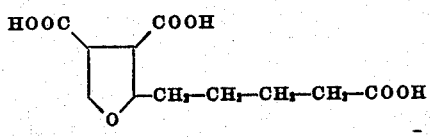

KLAUS HOFMANN.